Figure 1:
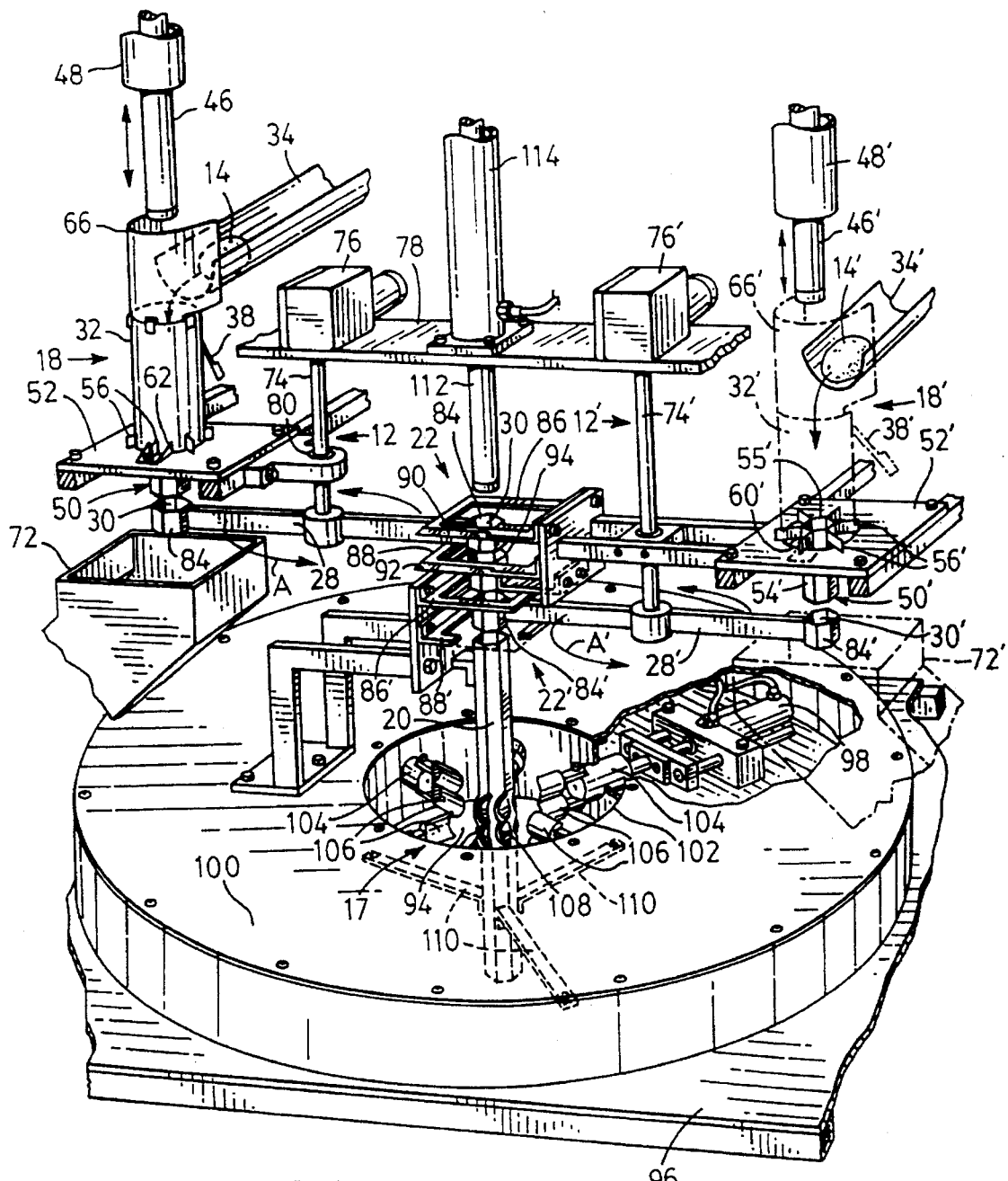

United States Patent [19]

Marton

[11] Patent Number: 5,582,096

[45] Date of Patent: Dec. 10, 1996

[54] VEGETABLE PEELING AND SHAPING MACHINE

[75] Inventor: John P. Marton, Sherwood, Canada

[73] Assignee: Shelburne Potato Co. Inc., Shelburne, Canada

[21] Appl. No.: 660,251

[22] Filed: Jun. 7, 1996

[51] Int. Cl.⁶ .......................... A23L 1/216; A23N 15/00; A23P 1/00; B26D 3/26

[52] U.S. Cl. .................. 99/541; 99/538; 99/546; 99/567; 99/584; 99/589; 99/636

[58] Field of Search ............... 99/537–546, 635–637, 99/642, 643, 584–599; 82/1.11, 130, 131; 426/637, 481–484

[56] References Cited

U.S. PATENT DOCUMENTS

| | | | |
|---|---|---|---|
| 1,284,132 | 11/1918 | Nikolow | 99/544 |
| 1,399,950 | 12/1921 | Fish | 99/545 |
| 3,504,720 | 4/1970 | Mason | 99/538 |
| 3,780,435 | 12/1973 | Farha et al. | 99/564 |
| 3,933,085 | 1/1976 | Rejsa | 99/589 |
| 4,108,565 | 8/1978 | Janssen | 90/593 |
| 4,352,325 | 10/1982 | Pleus | 99/545 |
| 5,060,563 | 10/1991 | Plant et al. | 99/544 |
| 5,102,678 | 4/1992 | Plant et al. | 426/481 |
| 5,181,458 | 1/1993 | Plant et al. | 99/538 |
| 5,228,397 | 7/1993 | Plant et al. | 99/589 X |
| 5,275,071 | 1/1994 | Plant et al. | 82/1.11 |
| 5,454,301 | 10/1995 | Rainey et al. | 99/544 |

*Primary Examiner*—Timothy F. Simone
*Attorney, Agent, or Firm*—Rogers & Scott

[57] ABSTRACT

A vegetable peeling and shaping machine has a preliminary cutting assembly for cutting off portions of a vegetable to produce a vegetable core insertable into a tube, and a main cutting assembly with a tube positioned to sequentially receive vegetable cores from the preliminary cutting assembly. A reciprocable plunger is operable to push the vegetable cores sequentially through the tube, the tube having a series of circumferentially spaced shaped slots therein, and a series of reciprocable non-rotatable cutter blades is circumferentially spaced around the tube. The cutter blades are shaped correspondingly to the slots in the tube and are movable from a position exterior to the tube through the slots into the tube to cut a vegetable core to form a vegetable product of the desired shape.

7 Claims, 5 Drawing Sheets

VEGETABLE PEELING AND SHAPING MACHINE

This invention relates to machines for peeling and shaping vegetables, for example root vegetables such as potatoes, carrots, turnips or beets.

Various machines have previously been proposed for peeling and shaping vegetables but, so far as applicant is aware, none have been particularly commercially successful in practice. One previously proposed machine is described in U.S. Pat. No. 5,060,563 (Plant et al.) issued Oct. 29 1991, the contents of which are hereby incorporated by reference. I am a co-inventor in the Plant et al. patent. The machine described therein has a pair of diagonally opposed rotatable cutting elements reciprocally movable through a pair of diametrically opposed circular apertures in a tube in which a vegetable core is located to cut the core to a desired shape. It was found that this machine was not sufficiently versatile with respect to producing different shapes of the vegetable product.

It is therefore an object of the present invention to provide a vegetable peeling and shaping machine which is more versatile with regard to the shape of the vegetable product produced.

According to the invention, a vegetable peeling and shaping machine comprises a preliminary cutting assembly for cutting off portions of a vegetable to produce a vegetable core insertable into a tube, and a main cutting assembly comprising a tube positioned to sequentially receive vegetable cores from the preliminary cutting assembly. A reciprocal plunger is operable to push the vegetable cores sequentially through the tube, and the tube has a series of circumferentially spaced slots therein. A series of reciprocable non-rotatable cutter blades are circumferentially spaced around the tube and are shaped correspondingly to the slots in the tube. The cutter blades are movable from a position exterior to the tube through the slots into the tube to cut a vegetable core to form a vegetable product of the desired shape.

The provision of a series of circumferentially spaced reciprocable non-rotatable shaped cutter blades and a tube with a series of correspondingly shaped circumferentially spaced slots enables a variety of different shapes of vegetable by changing the cutter blades and the tube.

The tube may be multi-sided and have one of the slots in each side, there being a corresponding number of reciprocal non-rotatable cutter blades spaced around the tube. Each cutter blade may be reciprocable in a direction substantially parallel to a side of the tube adjacent the side having the slot into which the cutter blade passes. The tube may have six sides, each with a shaped slot, with six reciprocable non-rotatable cutter blades being spaced around the tube.

The preliminary cutting assembly may cut off the sides, top and bottom of the vegetable, and comprise a first portion for removing the sides of the vegetable and a second portion for removing the top and bottom of the vegetable. The preliminary cutting assembly may also include a movable transport arm having a vegetable receiving aperture which receives a vegetable from the first portion of the assembly and transports the vegetable to the second portion thereof.

Figure 2:
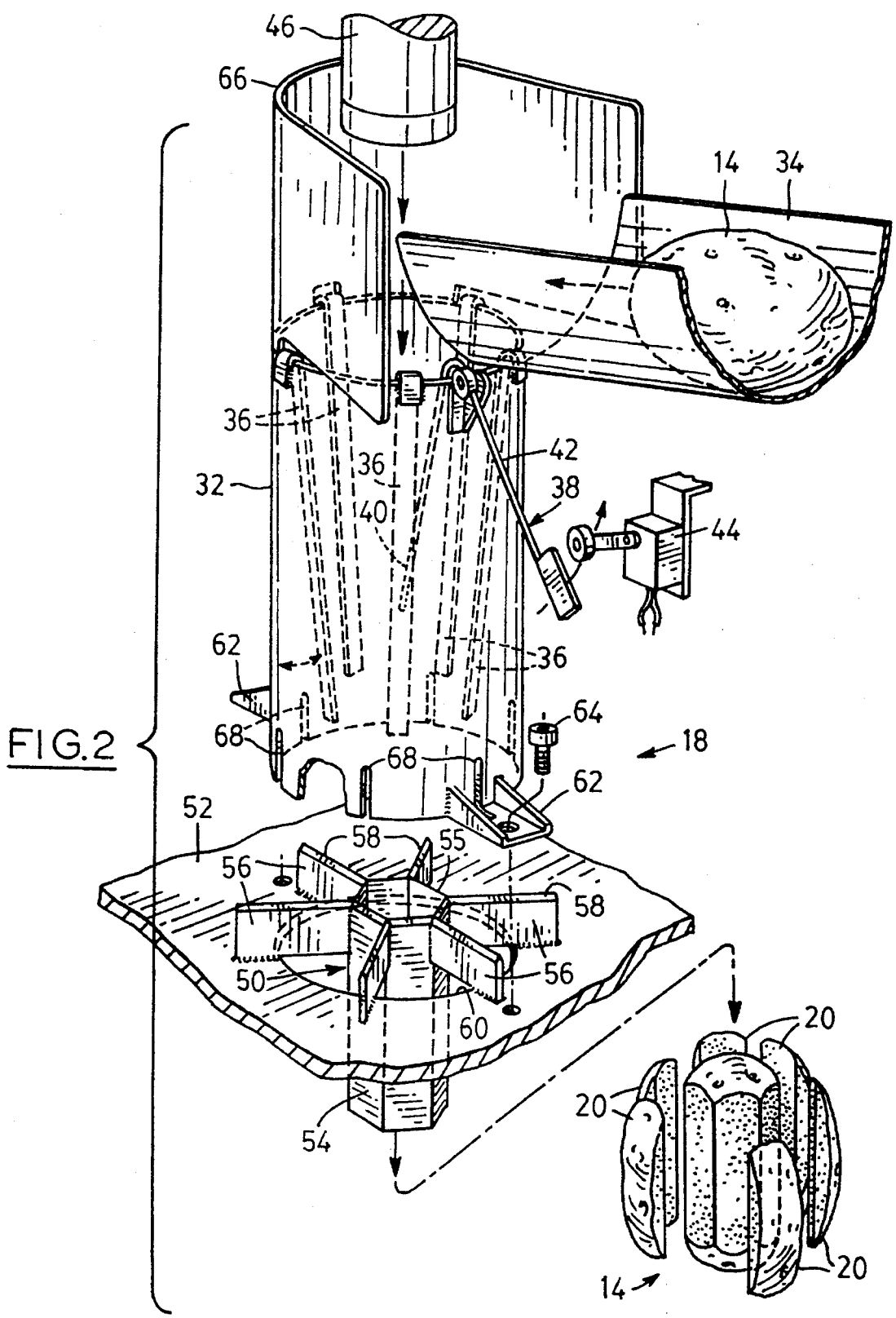
Figure 3:
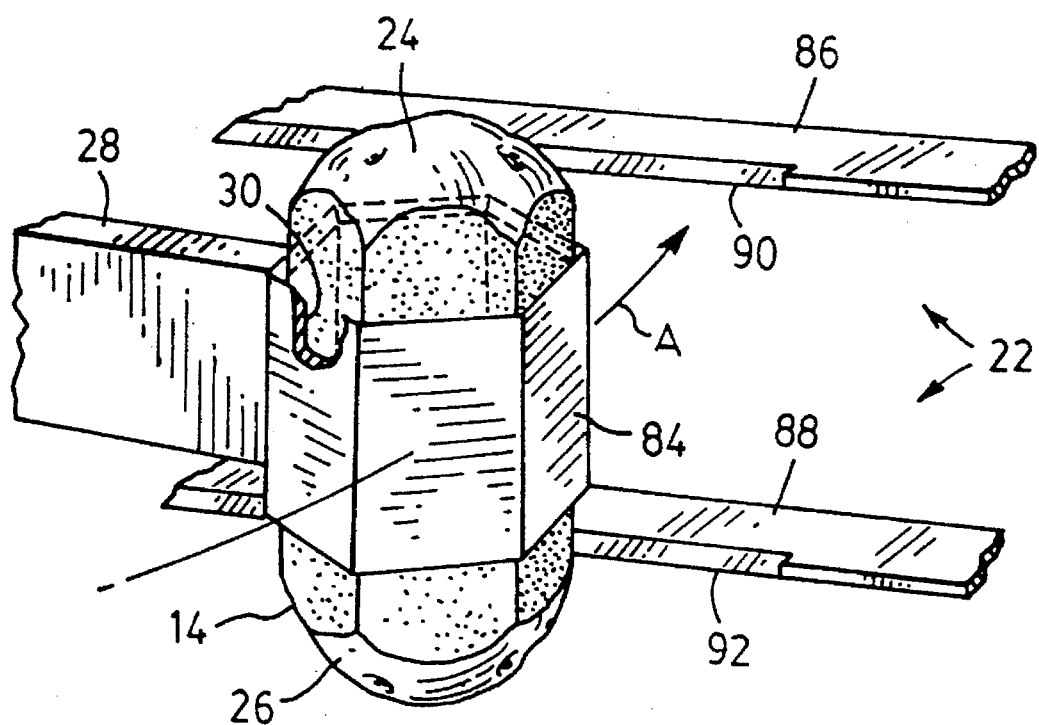
Figure 5:
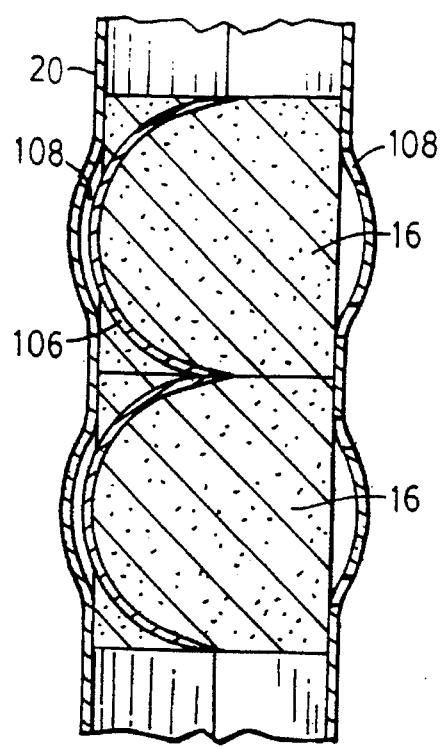
Figure 6:
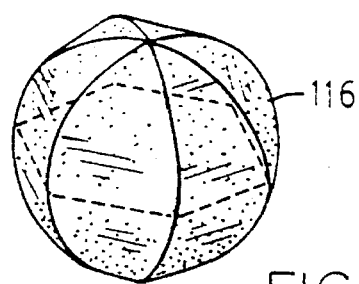
Figure 4:
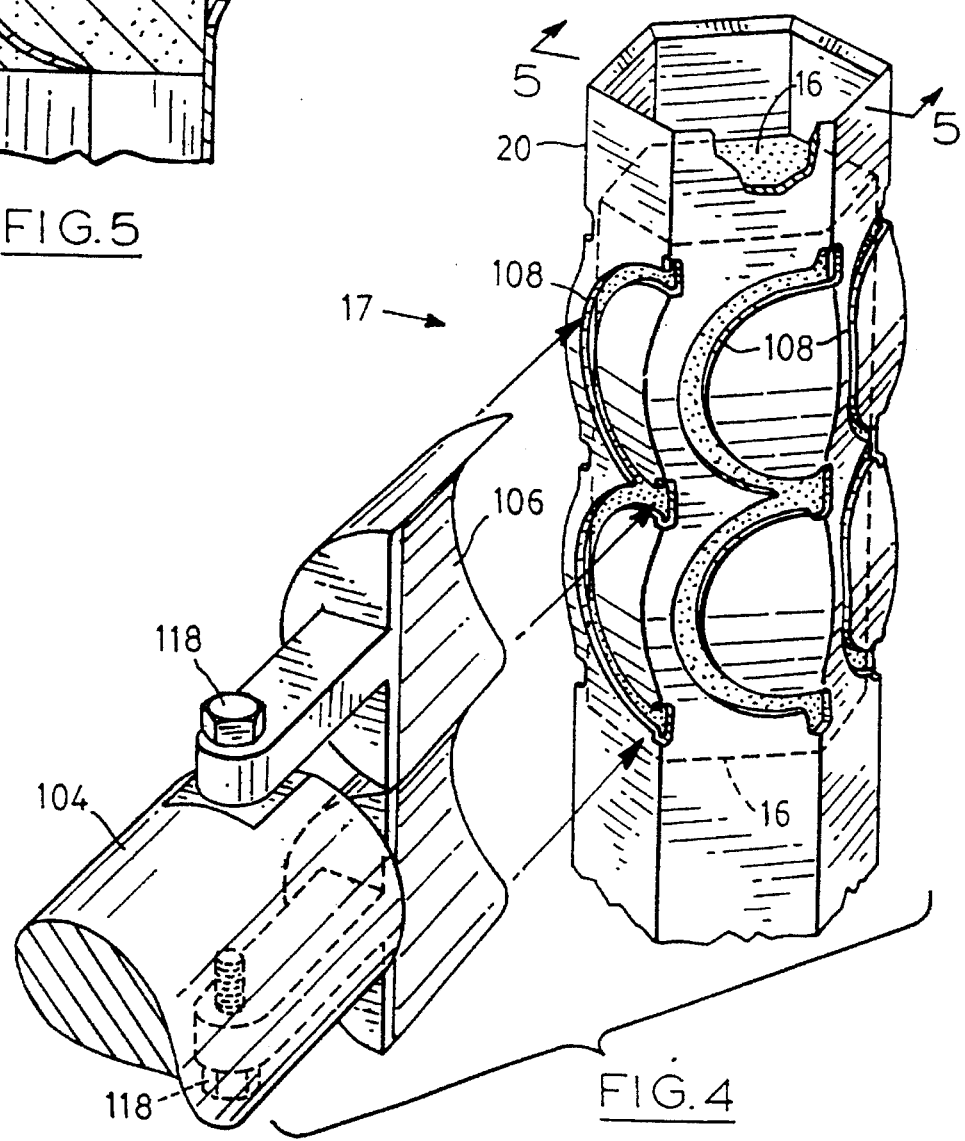
Figure 7:
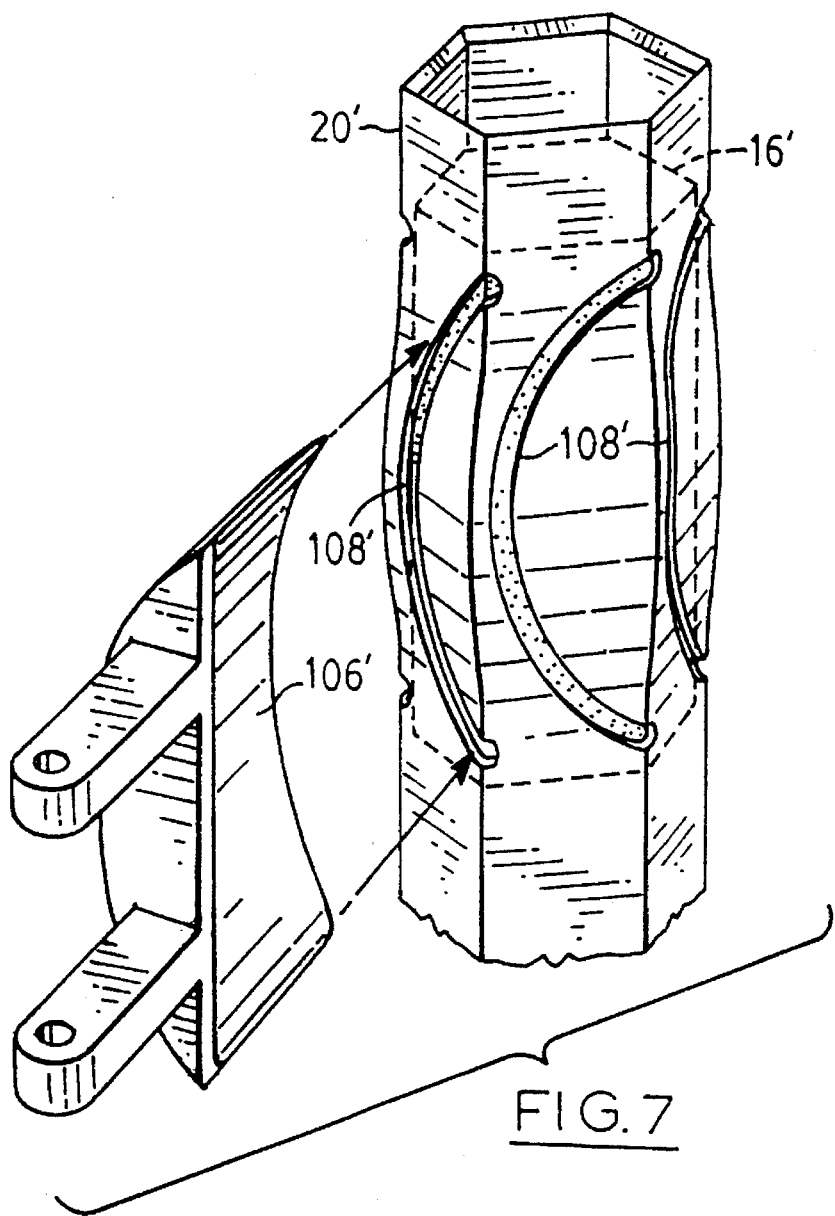
Figure 8:
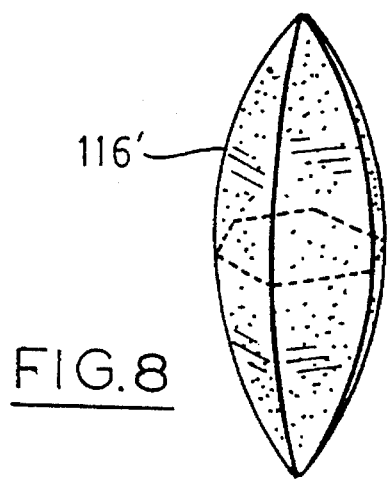

Embodiments of the invention will now be described, by way of example, with reference to the accompanying drawings, of which:

FIG. 1 is a schematic respective view of a potato peeling and shaping machine in accordance with one embodiment of the invention, FIG. 2 is an enlarged exploded schematic view of the preliminary cutting assembly of the machine, FIG. 3 is a fragmentary perspective view of one of the transport arms approaching the second portion of the preliminary cutting assembly, FIG. 4 is a similar view of one of the cutter blades and the tube of the main cutting assembly, FIG. 5 is a sectional view along the line 5—5 of FIG. 4, FIG. 6 is a perspective view of the potato product produced by the cutter blades and tube shown in FIG. 4, FIG. 7 is a view similar to FIG. 4 but showing a different cutter blade in tube, and FIG. 8 is a perspective view of the potato product produced by the cutter blade and tube shown in FIG. 7.

Referring to the drawings, FIGS. 1 to 5 show a potato peeling and shaping machine in accordance with one embodiment of the invention. The machine has a preliminary cutting assembly 12 for cutting off portions of a potato 14 to produce a potato core 16, and a main cutting assembly 17 having a tube 20 positioned to sequentially receive potato cores 16 from the preliminary cutting assembly 12.

The preliminary cutting assembly 12 has a first portion 18 for removing the sides 20 of a potato 14, and a second portion 22 for removing the top 24 and bottom 26 of the potato 14. The preliminary cutting assembly 12 also includes a movable transport arm 28 having a potato receiving aperture 30 which receives a sideless potato 14 from the first portion 18 of the preliminary cutting assembly 12 and transfers the potato 14 to the second portion 22 thereof. In this embodiment, the preliminary cutting assembly 12 is duplicated to provide faster production. For ease of description, one preliminary cutting assembly 12 is identified by reference numerals without primes, and the other preliminary cutting assembly 12' is identified by reference numerals with primes.

As shown in FIGS. 1 and 2, the preliminary cutting assembly 12 has a vertical feed tube 32 which receives potatoes 14 sequentially, i.e. one at a time, from a vibrating feed chute 34. Within the feed tube 32, downward movement of a potato 14 is arrested by a series of downwardly-extending deflectable resilient fingers 36 which are spaced around the interior of the tube 32. A detector 38 to detect the presence of a potato in the feed tube 32 has a finger 40 within the tube 32 which is deflected by a potato 14 therein to cause an arm 42 connected to the finger 40 to actuate an electrical switch 44. Actuation of switch 44 causes a reciprocable feed plunger 46 to move downwardly from a pneumatic cylinder 48 into the tube 32 to force the potato 14 into a side-removing cutter tube 50 mounted on the platform 52.

The side-removing cutter tube 50 has a hexagonally shaped vertical tubular body 54 with six radially extending blades 56 having horizontal upper cutting edges 58. The upper end of the tubular body is level with the cutting edges 58 and is shaped to provide a hexagonal cutting edge 55. The tube 50 extends through an aperture 60 in the platform 52, and the blades 56 are located above the aperture 60. Inner portions of the blades 56 are directly over the aperture 60, and the outer portions of the blades 56 extend over portions of the platform 52 surrounding the aperture 60 and are secured to the platform 52, for example by welding.

The feed tube 32 has lugs 62 at its lower end with apertures through which screws 64 pass to secure the feed tube 32 to the platform 52. A deflector 66 is mounted on the top of feed tube 32 to deflect potatoes 14 from the chute 34 into the feed tube 32. The feed tube 32 is of the same diameter as the aperture 60 in the platform 52, and the blades 56 extend through slot 68 in the lower end of feed tube 32.

Thus, a potato 14 passes from the chute 34 into the feed tube 32 where its downward movement is arrested by fingers 36. At the same time, a finger 40 is deflected to cause actuation of the switch 44 and consequent downward movement of the plunger 46. The plunger 46, passes downwardly into the tube 32 to force the potato 14 through the aperture 60 in the platform 52. The sides 20 of the potato 14 are cut off the cutting edges 55, 58 and pass through portions of the apertures 60 outside the tubular body 54. The sideless potato 14 passes downwardly through the tubular body 54. The downward travel of the plunger 46 is sufficient to push the potato 14 out of the bottom of the tubular body 54 into an aperture 30 of the transport arm 28 as will be described in more detail later. The sides 20 of the potato fall into a chute 72 for use as desired. The transport arm 28 is mounted on the lower end of a rotatable shaft 74 projecting downwardly from a pneumatic motor 76, the motor 76 being carried by a platform 78. The shaft 74 extends through a bearing 80 carried by platform 52. The transport arm 28 has a vertical sleeve 84 at each end providing a potato receiving aperture 30 of the same size and shape as the cross-section of tube 54. Transport arm 28 is rotatable in increments of 180° by motors 76 with one aperture 30 being below tube 50 and the other aperture 30 being over tube 20 of main cutting assembly 18.

Two vertically spaced horizontal cutting frames 86, 88 are mounted above tube 20 respectively above and below transport arm 28, the cutting frames 86, 88 having forwardly facing cutting edges 90, 92. Transport arm 28' and cutting frames 86', 88' of the other preliminary cutting assembly 22' are mounted below cutting frames 86, 88. The cutting edges of cutting frames 86', 88' face rearwardly and hence are not visible in FIG. 1. Also, a short hexagonal guide tube 94 is mounted between cutting frames 88, 84'. It will be clearly evident from FIG. 1 that the various parts of the machine specifically referred to are mounted on parts of the machine not specifically referred to, as will be readily apparent to a person skilled in the art from a review of FIG. 1.

The motor 76, 76' are operated in synchronism with plunger 46. As soon as plunger 46 forces a sideless potato 14 to an aperture 30 in transport arm 28, the motor 76 is actuated to rotate transport arm 28 through 180° in the direction of arrow A in FIGS. 1 and 3. As the potato 14 in the aperture 30 approaches the vicinity of tube of the main cutting assembly 18, the top and bottom of potato 14 are cut off by the cutting edges 90, 92 of cutting frames 84, 86 to form a potato core 16.

It will now be convenient to describe the construction and operation of the main cutting assembly 17 before continuing description of the operation of the preliminary cutting assemblies 18, 18'. The tube 20 of the main cutting assembly 17 passes downwardly through an aperture 94 of a main platform 96 of the machine. The main platform 96 carries 6 pneumatic cylinders 98 (only one of which is shown). The cylinders 98 are contained within a cover 100 secured to the platform 96 and having a central aperture 102 aligned with the platform aperture 94. Each cylinder 98 has a reciprocal shaft 104 which projects into the aperture 102 and carries a shaped cutter blade 106. The tube 20 which is of hexagonal shape has 6 vertical slots 108 corresponding in shape to the shape of the cutter blades 106. The tube 20 has three struts 110 secured to a suitable part of the frame of the machine.

A feed plunger 112 is mounted in a pneumatic cylinder 114 above the cutting frames 84, 86, the cylinder 114 being mounted on platform 78 and operated in synchronism with cylinders 48, 48' motors 76, 76' and cylinders 98.

The cylinders 48, 48' and transport arms 28, 28' of the preliminary cutting assemblies 18, 18' function to sequentially position potato cores 16 below the plunger 112. As soon as a potato core 16 is below plunger 112, cylinder 114 is operated to move plunger 112 downwardly to push the potato core 16 from the aperture 30 or 30' into the tube 20. It will be noted that, if the potato core 16 is in an aperture 30, then the plunger 112 pushes the core 16 through guide 94 and aperture 30 before pushing the core 16 into the tube 20. A sequence of cores 16 one above the other passes downwardly through tube 20 in increments equal to the depth of two cores 16.

Each time two cores 16 are in the portion of the tube 20 with the slots 108, first third and fifth cylinders 98 are operated to cause their cutter blades 106 to pass through the slots 108 and cut the two cores 16 aligned therewith accordingly, the blades 106 then being withdrawn. The second fourth and sixth cylinders 98 are then actuated to reciprocate their cutter blades 106 in the same manner to produce potato products 116 as shown in FIG. 6. The shape of such potato products may be referred to as hexagonal Parisienne. With subsequent sequences of operation, the potato products 116 together with the cut-off portions are forced from the bottom of the tube 20 and are collected in any convenient manner.

It will be noted that the cutter blades 106 are secured to the reciprocal shafts 104 by bolts 118. It is thus a relatively simple matter to replace cutter blades 106 by cutter blades of another shape, such as the cutter blades 106' shown in FIG. 7. Likewise, the tube 20 can be replaced by a tube 20' with appropriately shaped slots 108'. In this case, each blade 106' cuts one potato core 16 to produce potato products 116' as shown in FIG. 8, the shape thereof generally being referred to as Chateau. For such shapes, only one preliminary cutting assembly 12 is used and other minor changes are made, as will be readily apparent to a person skilled in the art.

The advantages and versatility of a vegetable cutting and shaping machine in accordance with the present invention will be readily apparent to a person skilled in the art from the foregoing description of preferred embodiments.

Other embodiments of the invention will also be clearly apparent to a person skilled in the art, the scope of the invention being defined in the appended claims.

I claim:

1. A vegetable peeling and shaping machine comprising:
   a preliminary cutting assembly for cutting off portions of a vegetable to produce a vegetable core insertable into a tube, and
   a main cutting assembly comprising a tube positioned to sequentially receive vegetable cores from the preliminary cutting assembly,
   a reciprocable plunger operable to push the vegetable cores sequentially through the tube,
   the tube having a series of circumferentially spaced shaped slots therein, and
   a series of reciprocable non-rotatable cutter blades circumferentially spaced around the tube, said cutter blades being shaped correspondingly to the slots in the tube and movable from a position exterior to the tube through the slots into the tube to cut a vegetable core to form a vegetable product of the desired shape.

2. A vegetable peeling and shaping machine according to claim 1 wherein the tube in multi-sided and has one of said slots in each side, there being a corresponding number of reciprocal non-rotatable cutter blades spaced around the tube.

3. A vegetable peeling and shaping machine according to claim 2 wherein each cutter blade is reciprocable in a direction substantially parallel to a side of the tube adjacent the side having the slot into which the cutter blade passes.

4. A vegetable peeling and shaping machine according to claim 2 wherein the tube has six sides, each with a shaped slot, and six reciprocable non-rotatable cutter blades are spaced around the tube.

5. A vegetable peeling and shaping machine according to claim 1 wherein the preliminary cutting assembly cuts off the sides, top and bottom of each vegetable.

6. A vegetable peeling and shaping machine according to claim 5 wherein the preliminary cutting assembly comprises a first portion for removing the sides of a vegetable and a second portion for removing the top and bottom of a vegetable.

7. A vegetable peeling and shaping machine according to claim 6 wherein the preliminary cutting assembly also includes a movable transport arm having a vegetable receiving aperture which receives a vegetable from the first portion of the assembly and transports the vegetable to the second portion thereof.

* * * * *